United States Patent [19]

Oliver et al.

[11] 4,310,026
[45] Jan. 12, 1982

[54] REMOTE CONTROL ARRANGEMENT FOR FLOW RATE VALVE

[75] Inventors: Robert J. Oliver, Westmont; Kenneth J. Lindblom, Clarendon Hills; Lloyd B. Idelman, Evanston; Carl S. Medo, Oak Lawn, all of Ill.

[73] Assignee: International Harvester Company, Chicago, Ill.

[21] Appl. No.: 114,179

[22] Filed: Jan. 22, 1980

[51] Int. Cl.³ ............................................. F16K 31/46
[52] U.S. Cl. .................................... 137/637; 74/491; 137/269; 137/351; 251/294
[58] Field of Search ................... 74/491; 137/269, 351, 137/637; 251/294

[56] References Cited

U.S. PATENT DOCUMENTS 3,492,889   2/1970   Hauff .................................. 137/637

FOREIGN PATENT DOCUMENTS 1914146  10/1969  Fed. Rep. of Germany ........ 74/491

Primary Examiner—Gerald A. Michalsky
Attorney, Agent, or Firm—F. David AuBuchon

[57] ABSTRACT

Individual rotary flow control valves associated with and metering hydraulic fluid flow through one or more directional control valves mounted on a tractor frame are connected by flexible push-pull cables to respective control sectors located adjacent the tractor seat so that an operator may control the flow rate to a remote hydraulically driven or adjusted implement from the tractor seat.

2 Claims, 5 Drawing Figures

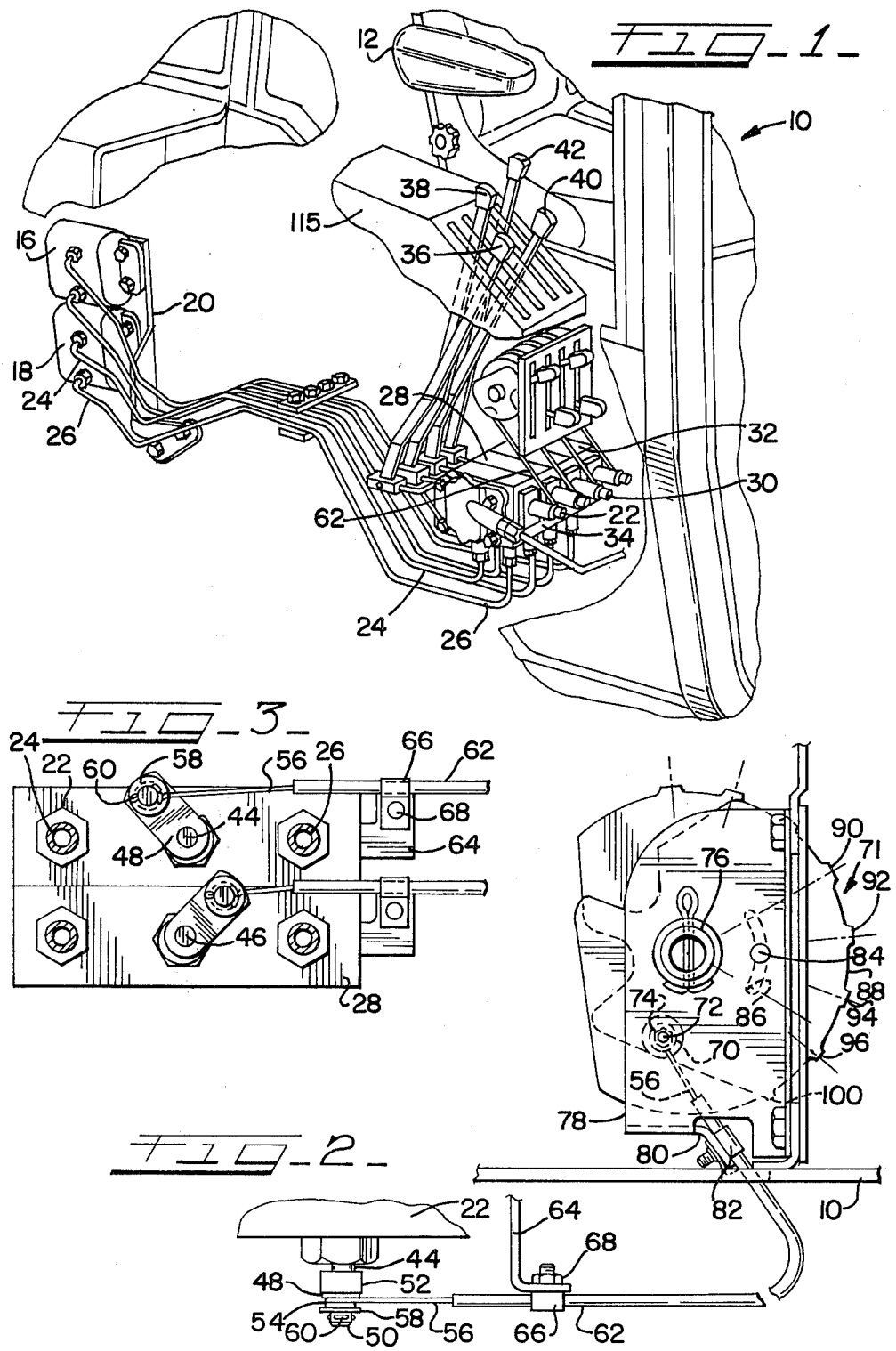

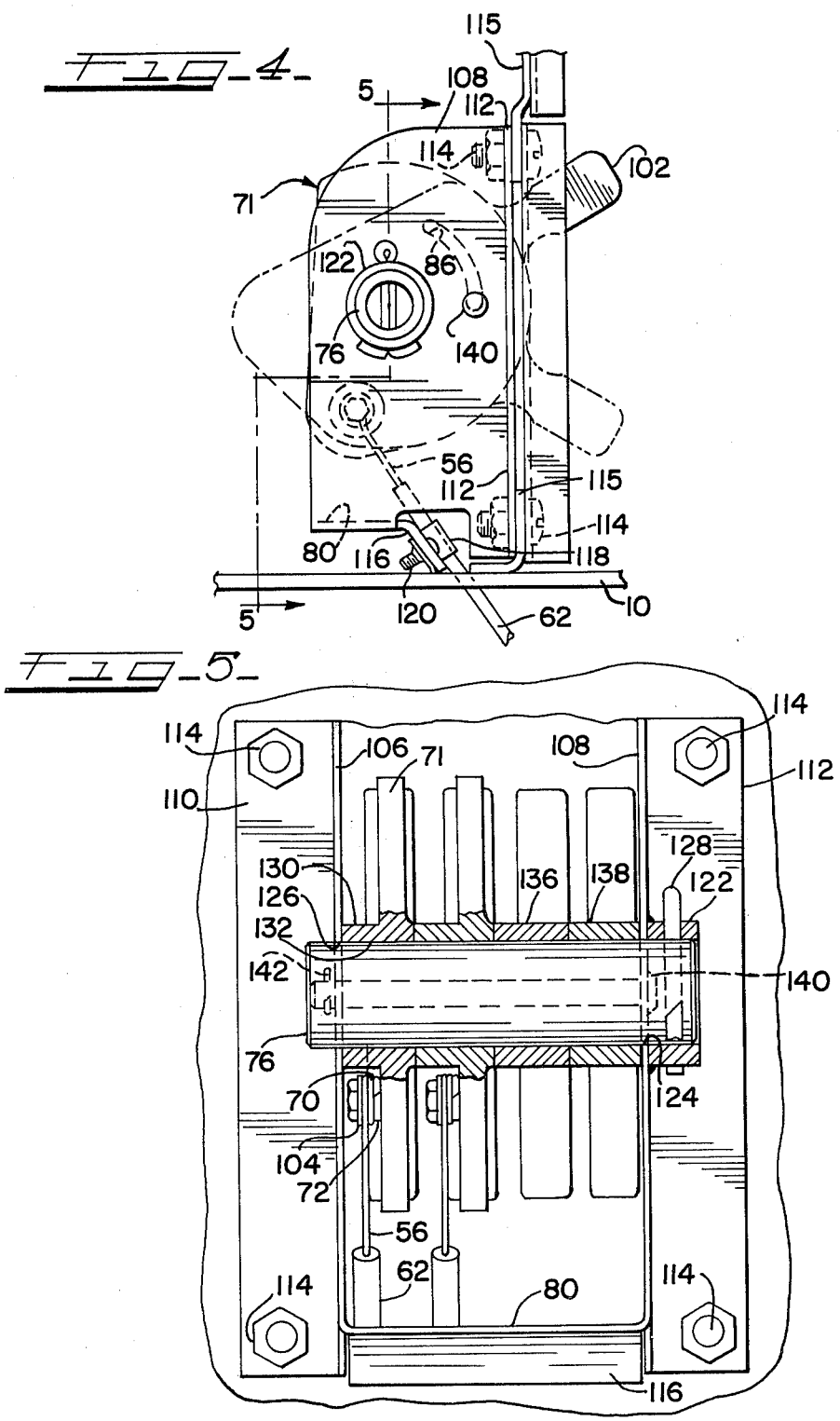

REMOTE CONTROL ARRANGEMENT FOR FLOW RATE VALVE

BACKGROUND AND SUMMARY OF THE INVENTION

It has long been common practice for farm implements, which are mounted on or pulled by tractors, to be driven by rotary hydraulic motors and/or adjusted or otherwise controlled by hydraulic actuators, such as hydraulic cylinders. The hydraulic fluid pressure is supplied to such implements by a pump driven by the tractor engine. The connection between the implement's hydraulic equipment and the tractor is through one or more pairs of hydraulic couplers, conventionally a pair of male hydraulic couplers on the hydraulic hoses of the implement being engageable with a complementary pair of female hydraulic couplers mounted on the tractor. Since the speed of the implement and/or the rate at which adjustments, such as raising and lowering the implement, for example, are made is a direct function of the rate at which hydraulic fluid is supplied to the implement hydraulic motors and/or actuators, it is necessary to control the rate of flow of such fluid from the tractor. Typically, this flow rate was controlled by operation of a lever on a flow control valve stem at a location remote from the tractor cab, which required the operator to stop the tractor, dismount from the cab, make the flow rate adjustment believed to be necessary and then remount the cab to operate the tractor-implement combination. When the effect of the adjustment could not be observed at the time of adjustment, the operator would be required to repeat this procedure until the proper flow rate was achieved.

It is, therefore, an object of this invention to provide a means for controlling from the operator's seat the rate of hydraulic fluid flow between a tractor and an associated implement.

It is also an object of this invention to provide such a means which isolates the tractor cab from the vibration and resulting noise associated with the flow rate control valve.

It is a further object to provide such a control means which visually coordinates a multiplicity of flow rate valves with the associated hydraulic couplers and their respective control means.

It is a still further object of this invention to provide such a control means with a touch sensing means to assist the operator in adjusting the flow rate by feel.

It is another object of this invention to provide such a control means which is readily adaptable to control a variable number of flow rate valves, which is compact, which can be assembled as a sub-assembly before attachment to the tractor for economy and ease of manufacture, and which permits relative motion between the valves secured to the tractor frame and a vibration-isolated cab mounted on that frame without affecting the setting of said control means.

These and other objects of this invention, and many of the attendant advantages thereof, will become more readily apparent upon a perusal of the following description and the accompanying drawings, wherein:

FIG. 1 is an isometric view of a tractor, with portions thereof broken away and omitted, showing a remote control arrangement according to the present invention;

FIG. 2 is a side elevational view of a control means according to the present invention;

FIG. 3 is a bottom plan view of a portion of the control means shown in FIG. 2;

FIG. 4 is a detail, in side elevation, of the control means shown in FIG. 1; and FIG. 5 is a cross-section view, with portions broken away, taken on line 5—5 of FIG. 4.

DESCRIPTION OF PREFERRED EMBODIMENTS

Referring now to FIG. 1, there is shown a portion of a tractor cab or operator's compartment, indicated generally at 10, including a seat 12. The entire cab is mounted on the tractor frame (not shown) with vibration isolation mounts which permit the cab limited movement relative to the frame, and thereby inhibit the transmission of frame borne vibration and noise into the cab. Female hydraulic couplers, two sets or pairs of which are shown at 16 and 18, are rigidly secured to the frame, such as by means of bracket 20. Each set of couplers is hydraulically connected to a directional control valve, the set 18 being connected to the directional control valve 22 by the conduits 24 and 26. Axial shifting of the spool in valve 22 in either direction will connect one of the conduits 24 and 26 with pressure from the tractor's hydraulic pump, while the other of the conduits 24 and 26 will be connected to reservoir. The valve 22 is mounted in a bank with other directional control valves 28, 30, and 32, the bank being connected to the tractor's frame by bracket 34. Levers 36, 38, 40 and 42 are provided within easy reach of an operator seated in the seat 12 to axially shift the valves 22, 28, 30 and 32 respectively.

A rotary flow control valve is incorporated into the body of each directional control valve and preferably is of the type shown in U.S. Patent Application Ser. No. 005,048 filed Jan. 22, 1979 by Leonard A. Bettin, now U.S. Pat. No. 4,214,446. The stem for the rotary valves 22 incorporated into the body of valve is shown in FIG. 2 at 44, while FIG. 3 shows both the stem 44 and the stem 46 for the rotary valve incorporated into the adjacent body of valve 28. Each rotary valve is, by rotation of its stem, capable of adjusting or controlling the rate of hydraulic fluid flow from the tractor's pump to its associated directional control spool. A description of one rotary valve and its control will be sufficient for an understanding of the others, since they are similar.

A lever 48 is affixed to the rotary valve stem 44 by any suitable means, such as by a press fit, so that the stem 44 turns with the lever 48. A pin 50 having an enlarged head 52 extends through an opening in the lever 48 with the head 52 engaging the lever 48. A coil or loop 54 formed on the end of a control cable 56 encircles the pin 50 and is trapped between the lever 48 and a washer 58, with a cotter pin 60 retaining the assembly on the pin 50. The cable 56 is slideable in a conduit or sheath 62. The sheath is secured to a bracket 64 affixed to the body of valve 22 by a clamp 66 which is held in place by a nut and bolt 68 so that the sheath 62 is immoveable relative to the bracket 64 while permitting the cable 56 to slide relative to the sheath 62. The cable 56 and the sheath 62 extend up and into the cab 10. A coil or loop 70 is formed on the other end of the cable 56, which coil is oriented 90 degrees from the coil 54 so that no twist or torsion is introduced into the cable 56. The coil 70 is pivotally connected to a control member 71 by encircling a pin 72 formed on the control member 71. The coil 70 is retained on the pin 72 by a washer and bolt 74.

The control member 71 is rotatably supported on a shaft 76 extending between two legs of a U-shaped frame 78. The sheath 62 is secured to the cross member 80 of the frame 78 by a clamp 82. A bar 84 is secured between the legs of the frame 78 and extends through an arcuate slot 86 formed in the control member 71 to limit the rotation of the member 71 in either direction. The outer edge 88 of the member 71 is a circular sector having its center on the centerline of the shaft 76. A series of extensions or bumps 90, 92, 94, 96 and 100 are formed on the edge 88. These bumps have progressively smaller width, or arc angle, along the circular sector, with bump 90 being the widest and 100 the narrowest. The wider bumps indicate a larger rate of flow than the narrower bumps, so that the operator can obtain by feel an indication of the setting of the control member 70 for the associated rotary flow control valve.

The cable 56 and sheath 62 transfers rotary motion of the control member 71 to the lever 48 and hence adjusts the rotary control valve through the stem 44. This cable and sheath comprises a flexible push-pull cable or Bowden wire which, while readily moveable relative to each other, introduce sufficient friction so that vibration emanating from or shock loads imposed by motion of the tractor will not allow unintended changes in the position of the control member 71. Also, because the cable and sheath are flexible, relative motion between the valves rigidly mounted on the tractor frame and the control member mounted on the cab, which is moveable relative to the frame, will not alter the setting of the control member 71. The position of the rotary valve is, therefore, changed only when intended by the operator.

The embodiment of this invention shown in FIGS. 4 and 5 is similar to that shown in FIGS. 1 and 2. The control cable 56 has its end coil 70 mounted on a hollow pin 72 formed on the control member 71 which, in this case, has a simple lever 102 extending outward from a smaller circular sector than that disclosed in connection with FIG. 2. A washer 104 is positioned on top the pin 72 and a metal fastener is threaded into the hollow pin 72 against the washer 104 to pivotally retain the coil 70 on the pin 72. The two legs 106 and 108 of the U-shaped frame 78 have flanges 110 and 112 respectively formed thereon, which permits the frame 78 and all of the components attached thereto to be secured with an opening in the control console 115 within the cab 10 by means of conventional fasteners 114. The cross member 80 is provided with an angled flange 116 to which the sheaths 62 may be fastened. In order to permit sub-assembly of the frame and its components, the sheath 62 has a clamp 118 affixed at a predetermined dimension from the adjacent end of the sheath 62. The clamp 118 is then secured to the flange 116 by bolt and nut combination 120, the flange 116 being oriented to provide the appropriate angle of approach for the cable 56 to the pin 72.

A collar or hub 122 is secured to the outer side of the leg 108 and surrounds a circular hole 124 in the leg 108. A similar hole 126 is provided in the opposite leg 106 and aligned with the hole 124. A shaft 76 extends through the two holes 124 and 126 and is retained in position by a cotter pin 128 inserted through alignable holes in the hub 122 and the shaft 76. The control member 71 has an axial hub 130 with a central bore 132 through which the shaft 76 is inserted. The axial width of the hub 130 is greater than the width of the remainder of the control member. The width is also related to the spacing between the legs 106 and 108 and to the total maximum number of flow control valves to be accommodated. Stated differently, the axial width of the hub 130 should be the distance between the legs 106 and 108 divided by the maximum number of valves to be controlled. If that maximum number is 4, then the width of the hub 130 should be one fourth the distance between the legs 106 and 108. Conversely, the distance between the legs should be four times the width of the hub. This arrangement permits the same frame 78 and its assembly to be used even though the tractor is originally manufactured with less than the maximum number of controls. This result is achieved by substituting spacers 136 and 138 for omitted control members 71, which spacers have the same axial width as the hub 130 of the control member. The omitted control members and associated valves can be added later by simply removing the cotter pin 128, withdrawing the shaft 76, removing the spacer or spacers 136, 138 and adding additional control members 71. Of course, the bar 84, which extends through aligned holes in the legs 106 and 108, must also be removed and reinstalled. To accomplish this, one end of the bar 84 is provided with an enlarged head 140 and a cotter pin 142 is removably inserted through an opening in the other end thereof.

The frame 78 is preferably arranged in the console 115 so that it is immediately below and aligned with the levers 36, 38, 40 and 42, or any lesser number of which may be provided. This provides the operator with a natural and reliable relationship between the lever for the directional control valve and the control member for the flow control valve in that particular directional control valve. It is even more helpful to provide a visual and readily recognizable relationship by color coordinating the coupler with its associated directional control valve lever and the related flow control member. For example, making the coupler 18, the end of lever 36 and the control member 71 all the same color will assist the operator in making the connection with the proper coupler initially and then assist in properly controlling what is connected with that coupler subsequently.

The frame 78 and all of the components attached to or mounted on it permits the entire control means, except for connections to the cable 56 and sheath 62 on the end remote from frame 78 to be sub-assembled. The frame 78 as thus sub-assembled is then bolted in place in the console 115 and the connection made between the cable 56 and the lever 48, the connection of the sheath 62 to the bracket 64 can be effected by utilizing a clamp 66 which can be located anywhere along the sheath 62 before tightening it in order to accommodate those dimensional variations normally encountered in manufacture.

It will be seen from the foregoing description that preferred embodiments of the invention have been presented that achieve all of the stated objects.

Various changes and modifications thereto may occur to those of skill in the art without departing from the spirit of the invention as defined by the scope of the appended claims.

What is claimed is:

1. A means for controlling the flow rate to a plurality of hydraulic circuits on a tractor having a console, each circuit including a rotary flow valve, comprising:
   a subframe including a pair of legs connected by a cross member;
   said legs having outward extending flanges to permit attachment of said subframe to said console;
   a hole in each leg, said holes being axially aligned;

a collar secured to one of said legs and having an opening coextensive with the hole in said one leg;

a shaft extending through said holes and said opening;

means for releasably securing said shaft to said collar;

a plurality of control members, each control member including a control sector and a hub having a given axial width greater than said sector;

each of said hubs having a bore to permit insertion of and rotation on said shaft;

an arcuate slot formed in each of said control sectors;

a limit bar releasably secured between said legs and extending through said slots to limit the rotation of said control members on said shaft;

a plurality of Bowden wires, each including a control cable and a sheath;

each control cable connected between one of said control sectors and a corresponding one of said rotary flow valves;

an angled flange formed on said cross member; and means for releasably securing said sheath to said latter flange.

2. The invention according to claim 1 wherein:

said plurality of hydraulic circuits is a predetermined maximum number;

said pair of legs are spaced apart a distance equal to said maximum number of hydraulic circuits times said given axial width; and a spacer having an axial width equal to that of said hub is positioned on said shaft for each hydraulic circuit less than said maximum number of hydraulic circuits.

* * * * *